United States Patent
Shi

(10) Patent No.: US 11,146,551 B2
(45) Date of Patent: Oct. 12, 2021

(54) ACCESS CONTROL

(71) Applicant: NEW H3C TECHNOLOGIES CO., LTD., Hangzhou (CN)

(72) Inventor: Hongshu Shi, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 165 days.

(21) Appl. No.: 16/097,817

(22) PCT Filed: May 17, 2017

(86) PCT No.: PCT/CN2017/084646
§ 371 (c)(1),
(2) Date: Oct. 30, 2018

(87) PCT Pub. No.: WO2017/198163
PCT Pub. Date: Nov. 23, 2017

(65) Prior Publication Data
US 2019/0141036 A1    May 9, 2019

(30) Foreign Application Priority Data

May 20, 2016   (CN) .......................... 201610345968.7

(51) Int. Cl.
*H04L 29/06* (2006.01)
*H04L 12/46* (2006.01)

(52) U.S. Cl.
CPC ...... *H04L 63/0876* (2013.01); *H04L 12/4633* (2013.01); *H04L 12/4641* (2013.01); *H04L 63/102* (2013.01)

(58) Field of Classification Search
CPC .............. H04L 9/00; G06F 21/00; G06T 7/00
See application file for complete search history.

(56) References Cited

U.S. PATENT DOCUMENTS 9,979,711 B2 *  5/2018  Ravinutala ............ H04W 80/02
10,097,372 B2 * 10/2018  Bhattacharya ........ H04L 45/745
(Continued)

FOREIGN PATENT DOCUMENTS

GN     103379010 A    10/2013
GN     104335532 A     2/2015
(Continued)

OTHER PUBLICATIONS

European Patent Office, Office Action Issued in Application No. 17798726.0, dated Dec. 18, 2019, Germany, 6 pages.
(Continued)

*Primary Examiner* — Joseph P Hirl
*Assistant Examiner* — Leynna Truvan
(74) *Attorney, Agent, or Firm* — McCoy Russell LLP

(57) ABSTRACT

A VXLAN Tunnel End Point (VTEP) sends an authentication request packet to an authentication server upon receiving a user access request from a user terminal, so as to cause the authentication server to perform an authentication for a user. The VTEP receives authorization information of the user for which the authentication is passed. The authorization information is sent by the authentication server, and includes a Virtual Switch Instance (VSI) identifier or a Virtual eXtensible LAN (VXLAN) identifier. The VTEP creates an Attachment Circuit (AC) interface on a user port connecting the user terminal of the VTEP. The VTEP associates the AC interface with the authorization information.

14 Claims, 4 Drawing Sheets

(56) References Cited

U.S. PATENT DOCUMENTS

| | | | |
|---|---|---|---|
| 2014/0123211 A1 | 5/2014 | Wanser et al. |
| 2014/0269705 A1 | 9/2014 | DeCusatis et al. |
| 2015/0058470 A1 | 2/2015 | Duda |
| 2015/0082418 A1 | 3/2015 | Gu |

FOREIGN PATENT DOCUMENTS

| | | | |
|---|---|---|---|
| GN | 105592062 A | 5/2016 |
| JP | 2007158594 A | 6/2007 |
| JP | 2011182111 A | 9/2011 |
| JP | 2016511978 A | 4/2016 |
| WO | 2014106945 A1 | 7/2014 |

OTHER PUBLICATIONS

State Intellectual Property Office of the People's Republic of China, Decision of Rejection Issued in Application No. 201610345968.7, dated Feb. 3, 2020, 8 pages. (Submitted with Partial Translation).
ISA State Intellectual Property Office of the People's Republic of China, Written Opinion of the International Searching Authority Issued in Application No. PCT/CN2017/084646, dated Jul. 20, 2017, WIPO, 4 pages.
European Patent Office, Extended European Search Report Issued in Application No. 17798726.0, dated Feb. 19, 2019, Germany, 9 pages.
State Intellectual Property Office of the People's Republic of China, Office Action and Search Report Issued in Application No. 201610345968.7, dated Oct. 9, 2019, 10 pages (Submitted with Partial Translation).
Japanese Patent Office, Office Action Issued in Application No. 2018-560827, dated Jul. 2, 2019, 8 pages. (Submitted with Machine Translation).
ISA State Intellectual Property Office of the People's Republic of China, International Search Report Issued in Application No. PCT/CN2017/084646, dated Jul. 20, 2017, WIPO, 4 pages.
State Intellectual Property Office of the People's Republic of China, Office Action and Search Report Issued in Application No. 201610345968.7, dated Mar. 12, 2019, 12 pages. (Submitted with Partial Translation).
European Patent Office, Office Action Issued in Application No. 17798726.0, dated May 15, 2020, Germany, 4 pages.
European Patent Office, Office Action Issued in Application No. 17798726.0, dated Mar. 11, 2021, Germany, 4 pages.

\* cited by examiner

ACCESS CONTROL

CROSS REFERENCE TO RELATED APPLICATIONS

This present application is a U.S. National Phase of International Patent Application Ser. No. PCT/CN2017/084,646 entitled "ACCESS CONTROL," filed on May 17, 2017. International Patent Application Ser. No. PCT/CN2017/084,646 claims priority to Chinese Patent Application No. 201610345968.7 filed on May 20, 2016. The entire contents of each of the above-cited applications are hereby incorporated by reference in their entirety for all purposes.

BACKGROUND

The present disclosure relates to network access control.

Virtual eXtensible LAN (VXLAN) is a layer-2 Virtual Private Network (VPN) technology using the encapsulation form of "Media Access Control (MAC) in User Datagram Protocol (UDP)" based on Internet Protocol (IP) network. VXLAN may provide layer-2 interconnection between distributed physical sites based on existing service providers or IP networks of enterprises and is able to provide isolation for business between different tenants.

In order to authenticate a user intending to access a VXLAN network, a layer-2 switch shall be provided between a VXLAN Tunnel End Point (VTEP) and a user terminal, and the access authentication for the user may be performed on the layer-2 switch. For example, in the process of performing access authentication for a certain user, the layer-2 switch sends an authentication request to an authentication server. The authentication server performs authentication for the user according to the authentication request and assigns Virtual Local Area Network (VLAN) to the user after the authentication is passed. The authentication server may send an identifier of the assigned VLAN (denoted as VLAN ID) to the layer-2 switch. After receiving the VLAN ID, the layer-2 switch may associate a user port connecting to the user terminal on the layer-2 switch with the VLAN ID. Subsequently, after a user packet sent by the user terminal reaches the layer-2 switch, the layer-2 switch will encapsulate the VLAN ID in the user packet and send it to the VTEP.

An Attachment Circuit (AC) interface may be pre-created on each physical port of the VTEP. After receiving a user packet through a certain physical port from the user terminal, the VTEP may search for AC interface that matches the physical port and VLAN ID and determine an identifier of VXLAN associated with the AC interface. The VTEP may then perform the VXLAN encapsulation on the user packet according to the determined identifier of VXLAN and forward the encapsulated packet.

DETAILED DESCRIPTION OF THE EMBODIMENTS

The technical solution in the examples of the present disclosure will be described clearly and fully in conjunction with the drawings in examples, and it will be apparent that the described examples are merely part of the examples of the present disclosure, rather than all examples. All other examples obtained by those of ordinary skill in the art based on the examples of the present disclosure without making creative work are within the scope of protection claimed by the present disclosure.

In the following examples of the present disclosure, there is provided a method of controlling access, and a device for controlling access to which the method may be applied.

In the networking shown in FIG. 1, the user terminals 120-1, 120-2, 120-3, 120-4, 120-5, ..., 120-n (hereinafter collectively referred to as the user terminal 120) may be accessed to VTEPs 130-1, 130-2, 130-3, ... 130-n (hereinafter collectively referred to as VTEP 130), respectively, and each user terminal 120 is accessed to VXLAN network via a VTEP 130 accessed by the user terminal. The VTEP 130 may enable an access authentication function and may communicate with an authentication server 150 via a layer-3 routing device 140. In this networking, the user terminal 120 accesses the VTEP 130 without through the layer-2 switch.

Figure 2:
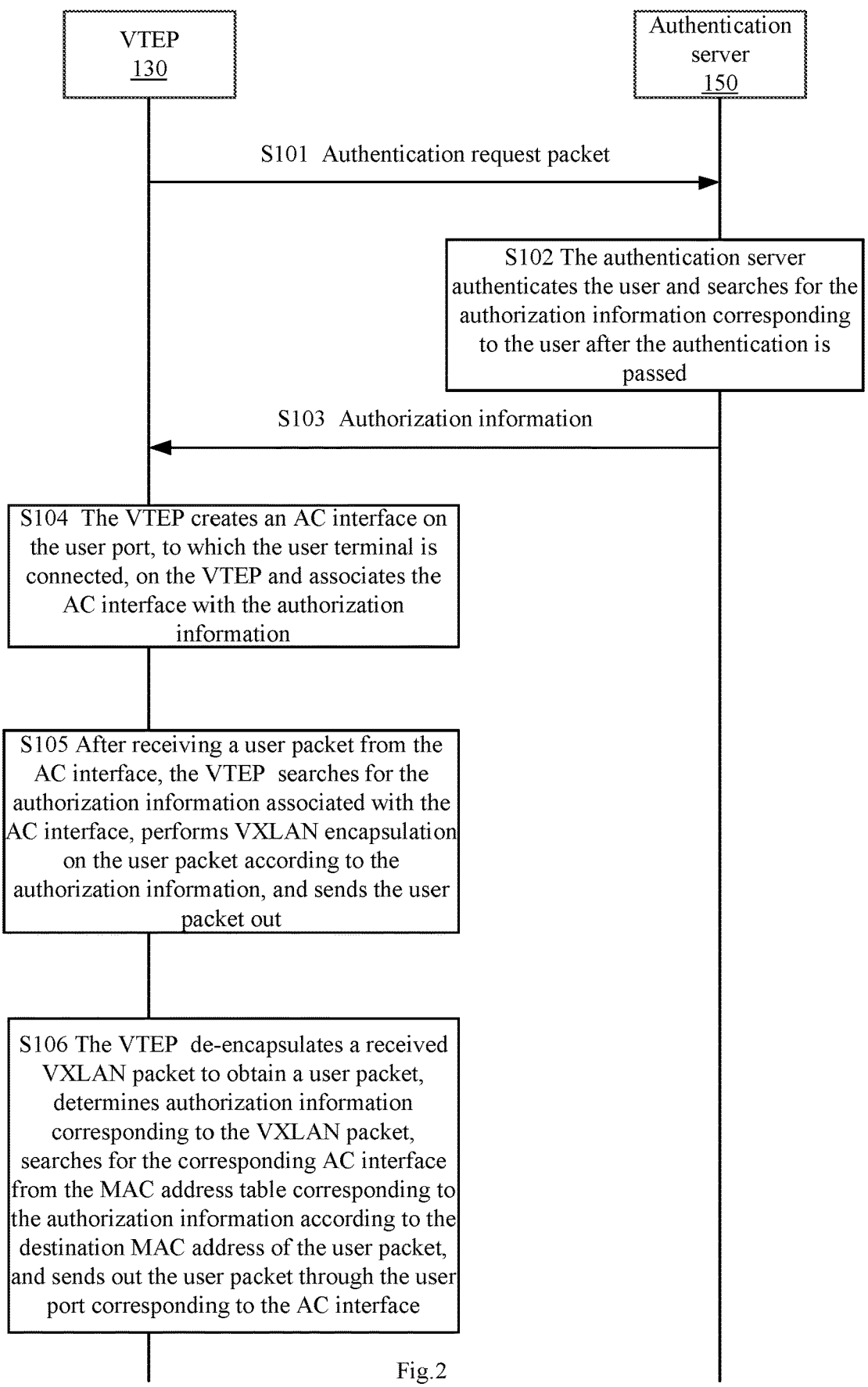
FIG. 2 is an interactive flow diagram of a method of controlling access shown in an example of the present disclosure.

An interactive flow diagram of a method of controlling access shown in an example of the present disclosure is as shown in FIG. 2.

At block S101, the VTEP 130 may send an authentication request packet to the authentication server 150 upon receiving a user access request from a user terminal, so that the authentication server performs authentication for a user.

In this example, a method of authenticating a user may be a MAC address authenticating method or an authenticating method defined by 802.1x protocol.

If the MAC address authenticating method is used, the VTEP 130 may determine whether the user has been authenticated after receiving Ethernet packet sent by the user terminal. If the user has not been authenticated, the VTEP 130 sends an authentication request packet carrying user name and password to the authentication server 150. Both the user name and password may be the MAC address of the user terminal, for example, the source MAC address of the Ethernet packet, or a constant user name and password saved on the VTEP 130. Herein, the Ethernet packet may be a user access request.

If the authenticating method defined by 802.1x protocol is used, the VTEP 130 may determine whether the user has been authenticated after receiving a 802.1x authentication request packet from the user terminal. If the user has not been authenticated, the VTEP 130 sends an authentication request packet carrying user name and password to the authentication server 150. Both the user name and password may be the user name and password carried in the 802.1x authentication request packet. Herein, the 802.1x authentication request packet may be a user access request.

According to an example, the method of determining whether the user has been authenticated may be as follows: searching an authentication recording table for a matching entry according to source MAC address of the Ethernet packet or 802.1x authentication request packet. If no matching entry is found, it indicates that the user has not been authenticated. In this case, an entry may be added to the authentication recording table, wherein the entry may contain the source MAC address, access authentication status, and authorization information, and wherein the access authentication status is set as "being authenticated".

In addition, an authentication request packet may carry: an identifier of user port connecting the user terminal of the VTEP 130, MAC address of the user terminal, and information on a VLAN to which the user terminal belongs. The user port is a port that receives the Ethernet packet or 802.1x authentication request packet. The MAC address of the user terminal is the source MAC address of the Ethernet packet or 802.1x authentication request packet. The VLAN to which the user terminal belongs is indicated by the VLAN information carried in the Ethernet packet or 802.1x authentication request packet.

The user ports mentioned in the present disclosure refer to a port on the VTEP by which the user access request is received, unless otherwise specified subsequently.

At block S102, after receiving the authentication request packet, the authentication server 150 performs authentication for the user and then searches for authorization information corresponding to the user after the authentication is passed.

The authorization information may be a Virtual Switch Instance (VSI) identifier or a Virtual eXtensible LAN (VXLAN) identifier.

The authentication server 150 may authenticate the user according to the user name and password carried in the authentication request packet, and searches for the authorization information corresponding to the user after the authentication is passed. One piece of authorization information may correspond to one or more users, and one user corresponds to only one piece of authorization information.

At block S103, the authentication server 150 sends the authorization information of the user for which the authentication is passed, to the VTEP 130.

At block S104, after receiving the authorization information, the VTEP 130 creates an AC interface on the user port connecting the user terminal of the VTEP 130 and associates the AC interface with the authorization information.

At block S103, the authentication server 150 may send the authorization information in any of the following ways.

According to an example, the authentication server 150 may send an authentication passing packet to the VTEP 130 after the authentication is passed. The authorization information may be carried in a vendor specific field of the authentication passing packet. For example, the Vendor Specific field may be in a format of Type Length Value (TLV). And wherein the Type field may be set to a specific value, for example 160, indicating that the Vendor Specific field is used to carry the authorization information. The Value field may be used to carry the authorization information.

In this way, in block S104, after receiving the authorization passing packet sent by the authentication server 150, the VTEP 130 may create an AC interface on the user port connecting the user terminal of the VTEP 130. And wherein, the AC interface may match the user port and the VLAN to which the user terminal belongs, or match the user port and the MAC address of the user terminal, or match the user port, the MAC address of the user terminal, and the VLAN to which the user terminal belongs. The VTEP 130 may then associate the AC interface with the authorization information carried in the authentication passing packet.

According to another example, the authentication request packet sent by the VTEP 130 may also carry the identifier of the user port connecting the user terminal of the VTEP, the MAC address of the user terminal, and the VLAN to which the user terminal belongs. Thus, the authentication server 150 may send an authentication passing packet and configuration information to the VTEP 130 after the authentication is passed. The configuration information may include the identifier of the user port connecting the user terminal of the VTEP 130, the MAC address of the user terminal, the VLAN to which the user terminal belongs, and the authorization information of the user. The authentication server 150 may send configuration information using a Netconf protocol or an Open vSwitch Database (OVSDB) management protocol or the like In this way, in block S104, after receiving the configuration information sent by the authentication server 150, the VTEP 130 may create an AC interface on the user port according to the configuration information. The AC interface may match the user port and the VLAN to which the user terminal belongs, or match the user port and the MAC address of the user terminal, or match the user port, the MAC address of the user terminal, and the VLAN to which the user terminal belongs. The VTEP 130 may then associate the AC interface with the authorization information.

It is assumed that the user port is denoted as Port1, and the MAC address of the user terminal is denoted as MAC1, and the VLAN to which the user terminal belongs is denoted as VLAN1. When creating an AC interface (denoted as AC1) on the Port1, the corresponding matching rule may be defined. This matching rule is used to match the AC1 with the Port1 and the VLAN1 to which the user terminal belongs. That is, the user packet belonging to the VLAN1, which is received from Port1, matches the AC1. As another example, the matching rule is used to match the AC1 with the Port1 and the MAC1. That is, the user packet with the source MAC address MAC1, which is received from the Port1, matches the AC1. As yet another example, the matching rule is used to match the AC1 with the Port1, the MAC1, and the VLAN1 to which the user terminal belongs. That is, the user packet with the source MAC address MAC1 and belonging to the VALN1, which is received from the Port1, matches the AC1.

In addition, in block S104, the VTEP 130 may update the access authentication status in the entry containing the MAC1 of the user terminal in the authentication recording table to "authentication passed" and add the authorization information to the entry.

At this point, the access request of the user is allowed, so that the user terminal may go online and send the user packet normally.

At block S105, after receiving the user packet from the AC interface, the VTEP 130 searches for the authorization information associated with the AC interface, and performs VXLAN encapsulation on the user packet according to the authorization information, and then sends the user packet out.

For example, after receiving the user packet from the Port1, the VTEP 130 may determine the AC1, which corresponds to the Port1 and the VLAN1 carried in the user packet so that the authorization information associated with the AC1 may be found. As another example, after receiving the user packet from the Port1, the VTEP 130 may determine the AC1 which corresponds to the Port1 and the source MAC address MAC1 of the user packet, so that the authorization information associated with the AC1 may be found. As yet another example, after receiving the user packet from the Port1, the VTEP 130 may determine the AC1 which corresponds to the Port1, the source MAC address of MAC1 of the user packet, and the VLAN1 carried in the user packet so that the authorization information associated with the AC1 may be found.

When the found authorization information is a VSI identifier, the VTEP 130 may search for the VXLAN identifier corresponding to the VSI identifier and send the user packet out after performing VXLAN encapsulation on the user packet. When the found authorization information is a VXLAN identifier, the VTEP 130 may send the user packet out after performing VXLAN encapsulation on the user packet.

At block S106, after receiving a VXLAN packet, the VTEP 130 de-encapsulates the VXLAN packet to obtain a user packet, determines authorization information corresponding to the VXLAN packet, searches for a corresponding AC interface from a MAC address table corresponding to the authorization information according to destination MAC address of the user packet, and sends out the user packet through a user port corresponding to the AC interface.

Subsequently, the VTEP 130 will delete the AC interface after the user goes offline.

In the method of the above example of the present disclosure, when receiving a user access request from a user terminal, the VTEP may send an authentication request packet to an authentication server. Thus, after receiving the authentication request packet, the authentication server will perform authentication the user and send authorization information corresponding to the user to the VTEP after the authentication is passed. The authorization information may be a VSI identifier or a VXLAN identifier. After receiving the authorization information, the VTEP creates an AC interface on a user port connecting the user terminal of the VTEP, and associates the AC interface with the authorization information, thus realizing the access control to the user terminal accessing to the VXLAN network.

In the above method, VTEP has an access authentication function. Therefore, there is no need to add a layer-2 switch between the VTEP and the user terminal to complete the access authentication to the user, which may effectively reduce the network level and reduce the network complexity. After receiving authorization information sent by the authentication server, the VTEP may dynamically create an AC interface without pre-creating the AC interface on each user port of the VTEP, thus saving the hardware resources effectively and reducing the configuration effort of the AC interface effectively.

Figure 3:
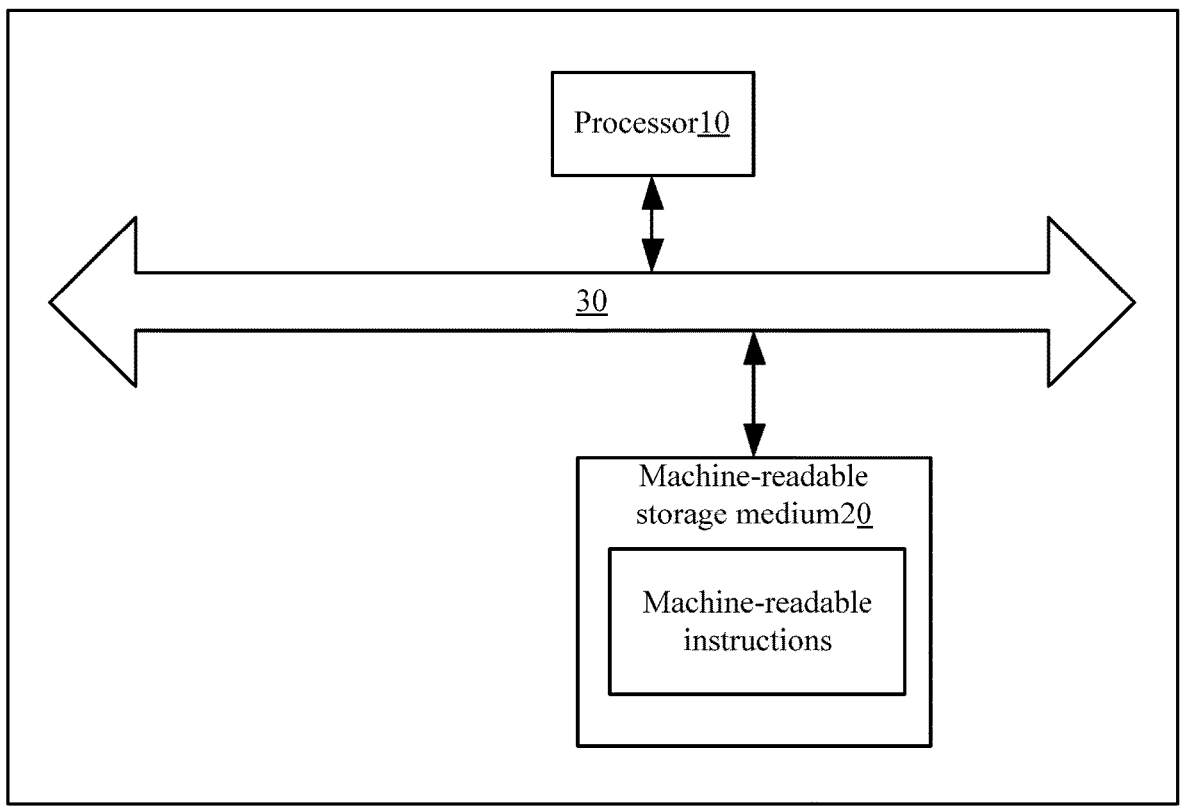
FIG. 3 is a schematic diagram of a hardware structure of a VTEP shown in an example of the present disclosure.

In an example, there is provided a VTEP device. From the hardware level, a schematic diagram of a hardware architecture can be seen in FIG. 3. The VTEP device provided by an example includes a machine-readable storage medium 20 and a processor 10.

The machine-readable storage medium 20 may store machine-readable instructions corresponding to a access control logic.

Figure 1:
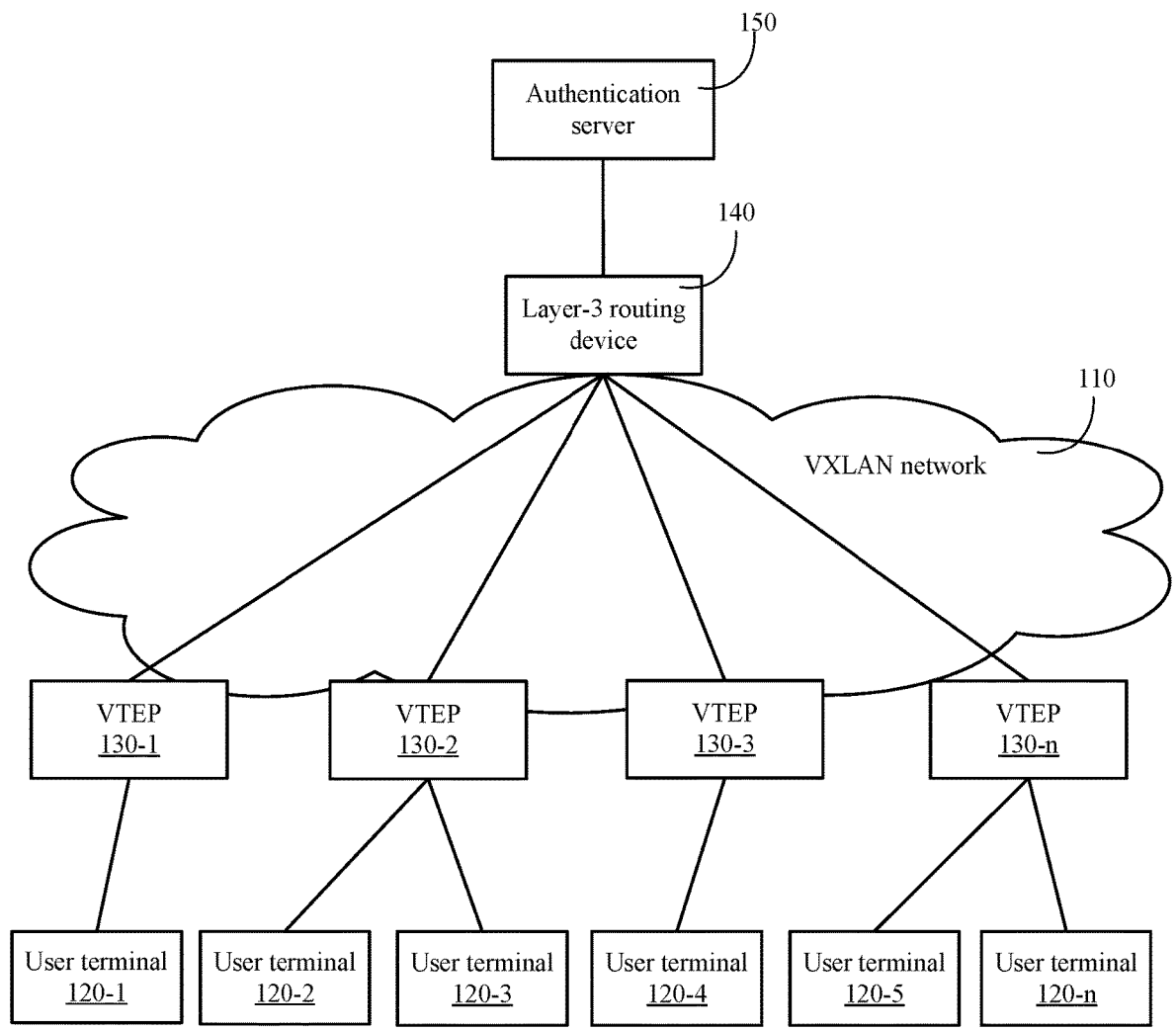
FIG. 1 schematically illustrates a networking diagram of a VXLAN network shown in an example of the present disclosure.

The processor 10 may communicate with the machine-readable storage medium 20 via a system bus 30, read and execute the machine-readable instructions stored in the machine-readable storage medium, and implement the method of controlling access disclosed in the above example of FIG. 1.

Figure 4:
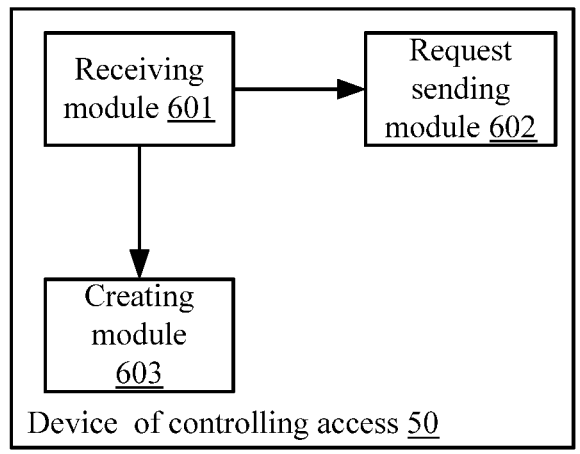
FIG. 4 is a block diagram illustrating functional modules of access control logic shown in an example of the present disclosure.

Herein, the machine-readable storage medium may be any of electronic, magnetic, optical or other physical storage devices and may contain or store information such as executable instructions, data, and so on. For example, the machine-readable storage medium may be: a Radom Access Memory (RAM), a volatile memory, a non-volatile memory, a flash memory, a storage drive (such as a hard disk drive), a solid state drive, any type of storage discs (such as a compact disc, dvd, etc.), or a similar storage medium, or a combination thereof. Based on the same conception as the above method of controlling access, an example of the present disclosure also provides a device of controlling access which may be applied to a VTEP device. As shown in FIG. 4, it is a structure diagram of a device of controlling access 50 proposed in an example. The device may include a receiving module 601, a request sending module 602, and a creating module 603.

The receiving module 601 may receive a user access request from a user terminal. In addition, the receiving module 601 may also receive authorization information of a user for which the authentication is passed, wherein the authorization information is sent by an authentication server and may include a VSI identifier or a VXLAN identifier.

The request sending module 602 may send an authentication request packet to the authentication server when the receiving module 601 receives the user access request from the user terminal so as to cause the authentication server to perform an authentication for the user.

The creating module 603 may create an AC interface on the user port connecting the user terminal of the VTEP device after the receiving module 601 receives the authorization information from the authentication server, and associate the AC interface with the authorization information.

According to an example, the receiving module 601 may be specifically configured to: receive an authentication passing packet sent by the authentication server after the user passes the authentication, wherein the authorization information of the user may be carried in a vendor specific field of the authentication passing packet.

According to another example, the receiving module 601 may be specifically configured to receive an authentication passing packet and configuration information sent by the authentication server after the user passes the authentication, wherein the configuration information includes authorization information of the user.

The AC interface may match the user port and the VLAN to which the user terminal belongs. As another example, the AC interface matches the user port and the MAC address of the user terminal. As yet another example, the AC interface matches the user port, the MAC address of the user terminal, and the VLAN to which the user terminal belongs.

Figure 5:
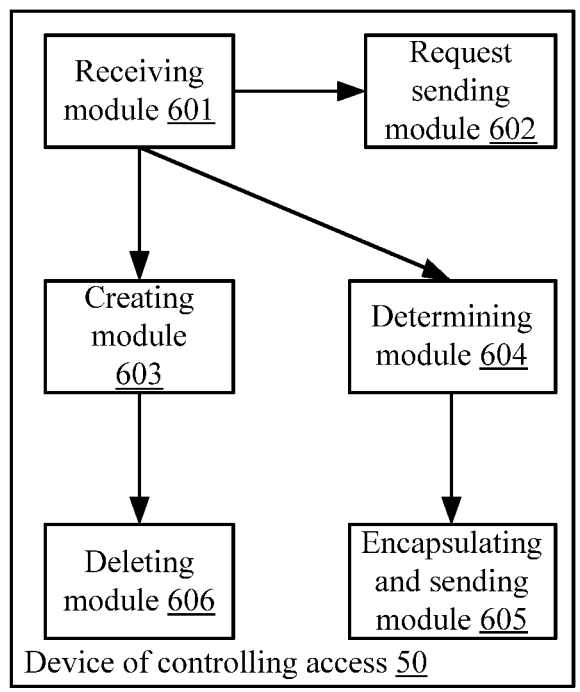
FIG. 5 is a block diagram illustrating functional modules of access control logic shown in another example of the present disclosure.

When the AC interface matches the user port and the MAC address of the user terminal, the above device of controlling access 50 may further include a searching module 604 and an encapsulating and sending module 605 as shown in FIG. 5. In this case, the receiving module 601 may also be configured to receive a user packet from the user port. The searching module 604 may be configured to search for an AC interface corresponding to the user port and the source MAC address of the user packet after the receiving module 601 receives the user packet from the user port, and determine the authorization information associated with the AC interface. The encapsulating and sending module 605 may be configured to obtain a VXLAN packet by performing VXLAN encapsulation on the user packet according to the authorization information found by the searching module 604, and send the obtained VXLAN packet.

When the AC interface matches the user port and the VLAN to which the user terminal belongs, the above device of controlling access 50 may further include a determining module 604 and an encapsulating and sending module 605 as shown in FIG. 5. In this case, the receiving module 601 may also receive a user packet from the user port. The determining module 604 may determine an AC interface which corresponds to the user port and a VLAN identifier carried in the user packet after the receiving module 601 receives the user packet through the user port, and determine authorization information associated with the AC interface. The encapsulating and sending module 605 may obtain a VXLAN packet by performing VXLAN encapsulation on the user packet according to the authorization information determined by the determining module 604, and send the obtained VXLAN packet.

When the AC interface matches the user port, the MAC address of the user terminal, and the VLAN to which the user terminal belongs, the above device of controlling access 50 may further include a determining module 604 and an encapsulating and sending module 605 as shown in FIG. 5. In this case, the receiving module 601 may also receive a user packet through the user port. The determining module 604 may determine an AC interface which corresponds to the user port, a source MAC address of the user packet, and a VLAN identifier carried in the user packet after the receiving module 601 receives the user packet through the user port, and determine authorization information associated with the AC interface. The encapsulating and sending module 605 may obtain a VXLAN packet by performing VXLAN encapsulation on the user packet according to the authorization information determined by the determining module 604, and send the obtained VXLAN packet.

In addition, as shown in FIG. 5, the above device of controlling access 50 may further include a deleting module 606 configured to delete the AC interface created by the creating module 603 after the user goes offline.

For the device example, since it corresponds substantially to the method example, reference is made to the partial description of the method example for the related part. The device example described above is merely illustrative, wherein the unit described as a separate component may or may not be physically separate, and the component shown as a unit may or may not be a physical unit, which may be located in one place or may be distributed to multiple network units. A part or all of the modules may be selected according to the actual needs to achieve the objective of the solution of the present example. One of ordinary skill in the art will understand and practice without making creative effort.

The method and device provided in the examples of the present disclosure have been described in detail. The principles and examples of the present disclosure have been described by way of specific examples herein, and the description of the above examples is merely for helping understand the inventive mechanism and its core idea of the present disclosure; meanwhile, for those of ordinary skill in the art, there will be changes in the examples and the scope of application in accordance with the teachings of the present disclosure. In summary, the contents of the specification should not be construed as limiting the present disclosure.

The invention claimed is:

1. A method of controlling access, comprising: sending, by a VXLAN Tunnel End Point VTEP, an authentication request packet to an authentication server upon receiving a user access request from a user terminal, so as to cause the authentication server to perform an authentication for a user; receiving, by the VTEP, authorization information of the user for which the authentication is passed, wherein the authorization information is sent by the authentication server and comprises a Virtual Switch Instance VSI identifier or a Virtual eXtensible LAN VXLAN identifier; creating, by the VTEP, upon the VTEP receiving the authorization information, an Attachment Circuit AC interface on a user port connecting the user terminal of the VTEP; and associating, by the VTEP, the AC interface with the authorization information,
wherein the method further comprises:
receiving, by the VTEP, a user packet from the user terminal through the user port;
determining, by the VTEP, the AC interface corresponding to the user port, and at least one of: a source Media Access Control, MAC, address of the user packet and a Virtual Local Area Network, VLAN, identifier carried in the user packet;
determining, by the VTEP, the authorization information associated with the determined AC interface; and
obtaining, by the VTEP, a VXLAN packet by performing a VXLAN encapsulation on the user packet according to the authorization information; and
sending out, by the VTEP, the obtained VXLAN packet.

2. The method according to claim 1, wherein the VTEP receives the authorization information of the user for which the authentication is passed, comprising: receiving, by the VTEP, an authentication passing packet sent by the authentication server in a case that the user passes the authentication; wherein the authorization information of the user is carried in a vendor specific field of the authentication passing packet.

3. The method according to claim 1, wherein the VTEP receives the authorization information of the user for which the authentication is passed, comprising: receiving, by the VTEP, an authentication passing packet and configuration information sent by the authentication server in a case that the user passes the authentication; wherein the configuration information comprises the authorization information of the user.

4. The method according to claim 1, wherein the AC interface matches the user port and the MAC address of the user terminal, the determining of the AC interface comprises determining, by the VTEP, the AC interface corresponding to the user port and the source MAC address of the user packet.

5. The method according to claim 1, wherein the AC interface matches the user port and the VLAN to which the user terminal belongs, the determining of the AC interface comprises determining, by the VTEP, the AC interface corresponding to the user port and the VLAN identifier carried in the user packet.

6. The method according to claim 1, wherein the AC interface matches the user port, the MAC address of the user terminal, and the VLAN to which the user terminal belongs, the determining of the AC interface comprises determining, by the VTEP, the AC interface corresponding to the user port, the source MAC address of the user packet and the VLAN identifier carried in the user packet.

7. The method of claim 1, further comprising: deleting, by the VTEP, the AC interface after the user goes offline.

8. A VXLAN Tunnel End Point VTEP device, comprising a processor and a non-transitory machine-readable storage medium storing machine-readable instructions which are executable by the processor to: send an authentication request packet to an authentication server upon receiving a user access request from a user terminal, so as to cause the authentication server to perform an authentication for a user; receive authorization information of the user for which the authentication is passed, wherein the authorization information is sent by the authentication server and comprises a Virtual Switch Instance VSI identifier or a Virtual eXtensible LAN VXLAN identifier; create, upon receiving the authorization information, an Attachment Circuit AC interface on a user port connecting the user terminal of the VTEP device; associate the AC interface with the authorization information; receive a user packet from the user terminal through the user port; determine the AC interface corresponding to the user port, and at least one of: a source Media Access Control, MAC, address of the user packet and a Virtual Local Area Network, VLAN, identifier carried in the user packet; determine the authorization information associated with the determined AC interface; obtain a VXLAN packet by performing a VXLAN encapsulation on the user packet according to the authorization information; and send out the obtained VXLAN packet.

9. The VTEP device according to claim 8, wherein upon receiving the authorization information of the user for which the authentication is passed, the processor is further caused by the machine-readable instructions to: receive an authentication passing packet sent by the authentication server in a case that the user passes the authentication; wherein the authorization information of the user is carried in a vendor specific field of the authentication passing packet.

10. The VTEP device according to claim 8, wherein upon receiving the authorization information of the user for which the authentication is passed, the processor is further caused by the machine-readable instructions to: receive an authentication passing packet and configuration information sent by the authentication server in a case that the user passes the authentication; wherein the configuration information comprises the authorization information of the user.

11. The VTEP device according to claim 8, wherein the AC interface matches the user port and the MAC address of the user terminal, the processor is further caused by the machine-readable instructions to: determine the AC interface corresponding to the user port and the source MAC address of the user packet.

12. The VTEP device according to claim 8, wherein the AC interface matches the user port and the VLAN to which the user terminal belongs, the processor is further caused by the machine-readable instructions to: determine the AC interface corresponding to the user port and the VLAN identifier carried in the user packet.

13. The VTEP device according to claim 8, wherein the AC interface matches the user port, the MAC address of the user terminal, and the VLAN to which the user terminal belongs, the processor is further caused by the machine-readable instructions to: determine the AC interface corresponding to the user port, the source MAC address of the user packet and the VLAN identifier carried in the user packet.

14. The VTEP device according to claim 8, wherein the processor is further caused by the machine-readable instructions to: delete the AC interface after the user goes offline.

* * * * *